United States Patent [19]

Nelson et al.

[11] 4,000,068

[45] Dec. 28, 1976

[54] POLLUTED WATER PURIFICATION

[75] Inventors: William T. Nelson; Hans D. Holtz, both of Bartlesville, Okla.

[73] Assignee: Phillips Petroleum Company, Bartlesville, Okla.

[22] Filed: Aug. 12, 1975

[21] Appl. No.: 603,974

[52] U.S. Cl. .............................. 210/50; 210/63 R
[51] Int. Cl.² ......................................... C02C 5/04
[58] Field of Search ........................... 210/50, 63 R

[56] References Cited

UNITED STATES PATENTS

| | | | |
|---|---|---|---|
| 3,054,653 | 9/1962 | Barton et al. | 210/63 |
| 3,575,853 | 4/1971 | Gaughan et al. | 210/50 |
| 3,804,756 | 4/1974 | Callahan et al. | 210/63 |
| 3,823,088 | 7/1974 | Box et al. | 210/63 |
| 3,912,626 | 10/1975 | Ely et al. | 210/63 |

*Primary Examiner*—Thomas G. Wyse

[57] ABSTRACT

Organically polluted waters are purified by contacting such waters with a water soluble copper salt catalyst in the liquid phase under oxidizing conditions. In one embodiment, an aqueous stream obtained from the effluent of an oxidative dehydrogenation process containing contaminating oxygen-containing organic materials is subjected to liquid phase oxidizing conditions in the presence of cupric nitrate under conditions providing sufficient cupric ion concentration to convert the water to a potable aqueous product.

6 Claims, No Drawings

POLLUTED WATER PURIFICATION

This invention relates to a process for purification of organically polluted waters. In accordance with another aspect, this invention relates to a process for converting organic contaminated aqueous streams to fresh potable water by oxidation in the presence of a water soluble copper salt. In accordance with another aspect, this invention relates to a process for the abatement of water pollution by removing oxidizable organic wastes from aqueous streams by oxidizing these compounds in the liquid phase in the presence of sufficient cupric ion concentration in the water phase to convert the water to a potable aqueous product which can be safely discarded or reused.

The problem of disposing of waste-containing waters has, in recent years, become more acute due to increasing population and increasing industrial activity. This is particularly true of waters which are polluted by the presence of organic materials such as waters discharged in a chemical process. Frequently, such waste waters contain organic materials in concentrations far too low for them to be conveniently or economically recoverable, yet in concentrations so high that it is impractical and undesirable to simply pump the waste water into available streams, rivers, lakes, or ponds.

Waste water effluents of the chemical and petroleum process industries yield waste streams contaminated by such organics as hydrocarbons, phenols, mercaptans, oxygenated hydrocarbons such as aldehydes, ketones, and the like. For example, in a recently developed process known as oxidative dehydrogenation moderate concentration of oxygenated hydrocarbons such as furan, alcohols, acids, aldehydes, ketones, etc., are generated and appear in the condensed steam and/or in the hydrocarbon effluent. Such streams need purification in order to be efficiently reduced in contaminating materials to be safely discarded or reused. The present invention relates to the process for the purification of waste water containing various organic compounds, typically, waste water originating from chemical plants and the like.

Accordingly, an object of this invention is to provide an improved process for the purification of organically polluted waters.

Another object of this invention is to provide a process for the purification of water streams containing oxygen-containing compounds.

A further object of this invention is to provide an effective catalyst for the purification of waste water containing various organic compounds.

Other objects, aspects, as well as the several advantages of the invention will be apparent to those skilled in the art upon reading the specification and the appended claims.

In accordance with the invention a process is provided for converting water contaminated with organic materials to a potable aqueous product by contacting contaminated water under oxidation conditions with a water soluble copper salt such as cupric nitrate under conditions sufficient to convert said organic materials to innocuous materials so that the aqueous stream which has been substantially freed of contaminating materials can be safely discarded or reused.

The water soluble copper salt catalyst of the invention is cupric nitrate. The cupric ion concentration can vary from about 50 to about 1500 parts per million (ppm) based on the weight of water to be treated. A more preferable concentration of cupric ion ranges from about 100 to about 1000 ppm. The water soluble cupric nitrate catalyst of the invention can be added per se to the process or a mixture of cupric hydroxide and nitric acid can be added so that cupric nitrate is formed in situ.

The process of the present invention can be carried out under a variety of conditions depending upon the feedstock, cupric ion concentration, temperature, desired degree of organic removal, and other conditions. The reaction can be carried out in any suitable apparatus and can be carried out either batchwise or continuously.

Generally, the reaction temperature can vary from about 150° to about 300° C. The residence time can vary from about 10 minutes to about 6 hours, more preferably from about 30 minutes to about 5 hours. The residence time is related to the oxygen partial pressure and reaction temperature employed. The reaction time decreases as the oxygen partial pressure and/or reaction temperature are increased.

The pressure of the oxygen used in the reaction ranges from about 10 to about 1000 psi (68.95 to 6895 kPa) above the steam pressure at the reaction temperature employed. More preferably, the pressure ranges from about 75 to about 500 psi (517.1 to 3447 kPa). The oxygen source can be pure oxygen, air or mixtures of oxygen and nitrogen and the like.

The reaction takes place under liquid phase conditions. A batch process using an autoclave can be employed, for example, or the process can be conducted continuously in a stirred reactor or in an unstirred coiled tube flow reactor. In a continuous process, a residence time for feed water of from 12 to 120 minutes is desirable. This corresponds to a space rate of about 0.5 to about 5 volumes of feed water per volume of reactor per hour.

It is preferred that the reaction takes place under slightly acid conditions. That is the pH should be less than 7 but greater than 2 and more preferably in the range of about 3 to about 6, based on initial pH values of the water plus additive.

The aqueous wastes which are applicable as feeds for the process of the present invention are those which contain minor amounts of dissolved and/or suspended organic materials. The process is particularly applicable for feeds in which the organic materials are hydrocarbons and/or oxygenated hydrocarbons. The organic materials can be present in the predominantly aqueous stream in a broad range of concentrations, but will ordinarily be present in amounts less than about 10 weight percent. It is generally more convenient to characterize the aqueous feeds by the total carbon content. Consequently, such feeds can contain from about 10 to about 100,000 ppm carbon, more frequently 25 to about 10,000 ppm carbon, still more frequently 100–5,000 ppm carbon.

Such aqueous waste streams can be derived from any source such as chemical or biological sources. For best results, the aqueous waste streams will contain relatively little non-volatile and/or non-oxidizable inorganic materials.

Effluent hot water from either a batch process or continuous process is passed through a bed packed with iron pieces, (wire, plate, etc.) at a 3–4 pH value to substantially remove cupric ions and solid copper oxide produced in the purification process. The iron going into solution is converted substantially into ferric oxide under the conditions employed. The final effluent contains about 1 ppm copper and about 1 ppm iron. Up to about 100 ppm iron may be present if insufficient heating of the treated water is not practiced thus calling for an adjustment in conditions such as higher temperatures or somewhat longer exposure at the treating conditions.

The water so treated is suitable for reuse as boiler water since the nitrate ion present inhibits scale formation. If the water is to be discharged into streams, it is necessary to catalytically convert the nitrate ion into molecular nitrogen to satisfy EPA regulations.

EXAMPLE I

In a batch process using a glass-lined rocking autoclave, to individual portions of waste water obtained from a butene oxidative dehydrogenation process having a chemical oxygen demand (COD) a 2500 mg/liter was added a copper compound. After charging the reactor, it was pressured to 100 psig (689.5 kPa gage) at about 25° C with a gas mixture containing 90 vol. % oxygen and 10 vol. % nitrogen. The reactor was then heated to the reaction temperature of 232° C which required about 1 hour, and the reaction was allowed to proceed for 3.5 hours while rocking the autoclave. The results are presented in the following table.

Table I

| | Effect Of Various Copper Compounds In Batch Purification Process | | | | | |
|---|---|---|---|---|---|---|
| Run Number | 1 | 2 | 3 | 4 | 5 | 6 |
| | (control) | | | | | |
| Copper Salt | None | CuCl | $CuSO_4$ | $Cu(OH)_2$ | $Cu(C_2H_3O_2)_2$ | $Cu(NO_3)_2$ |
| Copper Conc. PPM | 0 | 1270 | 870 | 310 | 305 | 125 |
| Initial pH | 3.4 | 3.4 | 3.4 | 3.4 | 3.4 | 3.4 |
| Final pH | 3.8 | 4.2 | 2.6 | 4.3 | 5.0 | 4.0 |
| Treated Water | | | | | | |
| COD, Mg/Liter | 562 | 225 | 183 | 473 | 850 | 73 |
| Per Cent Removal | 77.5 | 91.0 | 92.7 | 81.1 | 66.0 | 97.1 |

Inspection of the results reveals that cupric nitrate is appreciably better in purifying waste water than the other copper compounds tested from a consideration of the greatest removal of the organic material and from the lowest concentration of copper used.

EXAMPLE II

The effect of reaction temperature and cupric ion concentration on purification of the same waste water of Example I was determined in a batch process. The same autoclave of Example I was employed in this study. The reaction was conducted generally for 3.5 hours at the listed temperatures, and an initial part pressure of 100 psig (689.5 kPa gage) of 90 vol. % oxyen — 10 vol. % nitrogen or of air as determined in the freshly charged reactor at about 25° C was employed as oxidant. The time to reach reaction temperature was about 1 hour as before. The results are presented in Table II.

Table II

| | Effect of Reaction Temperature and Copper Concentration In Batch Purification Process | | | | | | | | | |
|---|---|---|---|---|---|---|---|---|---|---|
| | Reaction | Contact | Concentration, PPM | | | pH | | Treated Water | | |
| Run No. | Temperature °C | Time Hours | $Cu^{++}$ | $NO_3^-$ | Oxidant | Initial | Final | COD Mg/Liter | Per Cent Removal | $Cu^{++}$ PPM |
| 7 (Control) | 177 | 3.5 | 0 | 0 | 90% $O_2$ | 3.4 | 3.4 | 2500 | 0 | 0 |
| 8 (Control) | 204 | 3.5 | 0 | 0 | " | 3.4 | 3.1 | 1190 | 52.4 | 0 |
| 9 (Control) | 232 | 3.5 | 0 | 0 | " | 3.4 | 3.8 | 562 | 77.5 | 0 |
| 10 (Control) | 260 | 3.5 | 0 | 0 | " | 3.4 | 4.3 | 507 | 79.7 | 0 |
| 11 | 177 | 3.5 | 770 | 1500 | " | 2.7 | 4.0 | 850 | 66.0 | 635 |
| 12 | 204 | 3.5 | 730 | 1430 | " | 2.7 | 3.0 | 388 | 84.5 | 655 |
| 13 | 232 | 3.5 | 770 | 1500 | " | 2.7 | 2.7 | 29 | 98.8 | 709 |
| 14 | 260 | 3.5 | 130 | 250 | air | 2.7 | 4.2 | 34 | 98.6 | 60 |
| 15 | 232 | 3.5 | 125 | 250 | 90% $O_2$ | 3.2 | 4.0 | 73 | 97.1 | 94 |
| 16 | " | 3.5 | 160(a) | 170 | " | 4.0 | 4.6 | 246 | 90.2 | 23 |
| 17 | " | 3.5 | 160(a) | 170 | air | 4.0 | 4.7 | 239 | 90.4 | 41 |
| 18 | " | 3.5 | 260 | 500 | " | 3.0 | 3.6 | 98 | 96.1 | 203 |
| 19 | " | 3.5 | 260 | 500 | 90% $O_2$ | 3.0 | 3.4 | 45 | 98.2 | 243 |
| 20 | " | 1.0 | 260 | 500 | " | 3.0 | 4.2 | 206 | 91.8 | ND* |
| 21 | " | 3.5 | 310(b) | 0 | " | 3.4 | 4.3 | 473 | 81.1 | ND* |
| 22 | " | 3.5 | 320(b) | 170 | " | 3.8 | 4.0 | 67 | 97.3 | 83 |
| 23 | " | 3.5 | 320 | 510 | " | 3.7 | 4.4 | 50 | 98.0 | 180 |
| 13 | " | 3.5 | 770 | 1500 | " | 2.7 | 2.7 | 29 | 98.8 | 709 |

Notes:
The nitrate ion concentration is the same before and after conducting runs containing cupric nitrate.
(a) $Cu(OH)_2 + HNO_3$
(b) $Cu(OH)_2$
*Not determined The results presented in Table II show that temperature is an important variable in the water purification process whether a catalyst is present or not. Noncatalytic runs 7–10 show at a constant reaction time as the reaction temperature is increased from 177° to 260° C that the per cent removal of organic matter of the water ranged from zero to about 80%. Under similar conditions but with a cupric nitrate catalyst present, 66% of the organic matter was removed at 177° C and 98.6% at 260° C. With catalyst present, the effect of temperature appears to be leveling out since at 232° C, 98.8% organic matter was removed.

Runs 15–23, generally show at a constant reaction time that a copper ion concentration ranging from 125 to 770 ppm is quite effective as a catalyst in this process. The data also show that a stoichiometric amount of nitrate ion is desirable to prevent loss of cupric ion. Run 21 clearly shows that the presence of nitrate ion is important in the process even though its concentration is unchanged after conducting the process. The function of the nirate ion appears to be keeping the cupric ion in solution where it can act as an active catalyst. Comparing runs 19 and 20 under similar conditions except that run 20 was conducted for 1 hour whereas run 19 was conducted for 3.5 hours it can be seen that the best results were obtained at the longer reaction time. However, almost 92% organic matter was removed even after only 1 hour in this process. Run 21 shows that copper hydroxide is not nearly as active as cupric nitrate in the oxidation process as the 81% removal of organic matter demonstrates. The hydroxide is too insoluble to furnish an appreciable number of cupric ions to improve the oxidation reaction.

EXAMPLE III

A process of purifying waste water of the type previously used in a continuous manner was investigated using a stirred reactor and a coiled tube reactor. In the runs, feed water was passed through each reactor at a space rate of about one volume water per volume reactor per hour (LHSR). Cupric nitrate solution, continuously metered into the feed water, was used as the catalyst at a concentration ranging from 130–150 ppm. The oxidant was technical grade cylinder oxygen and it was continuously fed to the reactor at a rate of 1 to 5.3 times that required for complete oxidation of the organic matter in the feed water. For feed water containing 2500 mg/liter COD, for example, 2500 mg/liter oxygen is required to completely react with the organic matter.

The stirred reactor was constructed of 316 stainless steel copperplated internally to reduce corrosion and loss of the cupric ion catalyst. The reactor volume was 300 ml.

The coiled tube reactor was constructed from a 20 foot length of ⅜ inch external diameter (0.952 cm) 321 stainless steel tubing lined with ¼ inch external diameter (0.635 cm) copper tubing, suitably enclosed in a container to allow heating and cooling of the coiled tube with a fluid medium such as water, steam, etc.

The conditions employed and results obtained are presented in the following table.

accomplished in a continuous manner. However, at the conditions employed, particularly in the coiled tube reactor, it is necessary to keep the oxygen rate greater than about 1.2 times stoichiometric to obtain good results. This indicates rather poor mixing of reactants under these conditions. Runs 33 and 34 show that an oxygen partial pressure of about 67 psi, even at a favorable stoichiometric rate, is too low to achieve the best results. An oxygen partial pressure of about 75 to about 500 psi, as previously described, appears to be quite suitable in the continuous process.

We claim:

1. A process for the purification of aqueous streams containing, as impurities, dissolved and oxidizable pollutants therein which process comprises reacting an aqueous stream containing oxidizable pollutant impurities with an oxygen-containing gas in the presence of about 50 to about 1500 ppm of cupric ions and a corresponding stoichiometric concentration of nitrate ions based on the weight of the water being treated under liquid phase oxidation conditions including a temperature of about 150° to about 300° C and sufficient oxygen to convert oxidizable pollutant impurities to innocuous materials.

2. A process according to claim 1 wherein the pressure of the oxygen containing gas during said contacting ranges from about 10 to about 1,000 psi above the steam pressure of the reaction temperature employed and said contacting is affected for a period of time ranging from about 10 minutes to about 6 hours.

3. A process according to claim 1 wherein said oxygen containing gas is air and the cupric ion concentration ranges from about 100 to about 1,000 ppm.

4. A process according to claim 1 wherein said aqueous stream contains hydrocarbons and oxygen containing hydrocarbon compounds and is obtained from the effluent from an oxidative dehydrogenation process.

5. A process according to claim 1 wherein said contacting is effected at a pH in the range of about 3 to about 6.

6. A process according to claim 1 wherein the effluent treated water obtained is contacted with a particulate iron under conditions to substantially remove cupric ions and solid copper oxide produced in the purification process and produce a final effluent containing about 1 ppm copper or less.

TABLE III

| | | | | | | | | | | Treated Water | | | |
|---|---|---|---|---|---|---|---|---|---|---|---|---|---|
| | | CONTINUOUS CATALYTIC OXIDATION OF WASTE WATER | | | | | | | | | | | |
| | | Reaction Pressure Gage | | Oxygen Gage | | | Concentration PPM | | FEED | COD | Per Cent | | |
| Run No. | Reaction Temp. ° C | PSI | kPa | PSI | kPa | Rate | $Cu^{++}$ | $NO_3^-$ | LHSR | Mg/Liter | Removal | $Cu^{++}$ | Reactor Used |
| 24 | 260 | 800 | 5516 | 135 | 930.8 | 1.4 | 130 | 250 | 0.96 | 430 | 82.8 | 40 | Stirred Tank |
| 25 | " | " | " | " | " | 3.2 | 130 | 250 | 0.98 | 400 | 84.0 | 45 | Stirred Tank |
| 26 | " | " | " | " | " | 1.2 | 150 | 290 | 1.13 | 1020 | 59.2 | 44 | Coil |
| 27 | " | " | " | " | " | 3.6 | 150 | 290 | 1.09 | 365 | 85.4 | 223 | Coil |
| 28 | " | 900 | 6205 | | 3.6 | 150 | 290 | 0.95 | 360 | 85.6 | 63 | Stirred Tank | |
| 29 | " | " | " | 1620 | " | 1.2 | 150 | 290 | 1.07 | 1200 | 52.0 | 122 | Coil |
| 30 | " | " | " | " | " | 2.2 | 150 | 290 | 1.12 | 370 | 85.2 | 187 | Coil |
| 31 | " | " | " | " | " | 5.3 | 150 | 290 | 1.06 | 275 | 89.0 | 208 | Coil |
| 32 | 274 | " | " | | 1.0 | 150 | 290 | 1.07 | 1235 | 50.6 | 65 | Coil | |
| 33 | " | " | " | 459.9 | " | 1.5 | 150 | 290 | 1.07 | 880 | 64.8 | 168 | Coil |
| 34 | " | " | " | " | " | 2.7 | 150 | 290 | 1.08 | 590 | 76.4 | 169 | Coil |

Inspection of the results in Table III demonstrates that fairly active oxidation of the organic matter can be

* * * * *